United States Patent
Greene et al.

(10) Patent No.: US 11,145,107 B2
(45) Date of Patent: Oct. 12, 2021

(54) ARTIFICIAL REALITY SYSTEM USING SUPERFRAMES TO COMMUNICATE SURFACE DATA

(71) Applicant: Facebook Technologies, LLC, Menlo Park, CA (US)

(72) Inventors: Richard Lawrence Greene, Kirkland, WA (US); Steve John Clohset, San Francisco, CA (US); Benjamin Charles Constable, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/739,928

(22) Filed: Jan. 10, 2020

(65) Prior Publication Data

US 2021/0134044 A1    May 6, 2021

Related U.S. Application Data

(60) Provisional application No. 62/930,493, filed on Nov. 4, 2019.

(51) Int. Cl.
  *G09G 5/00* (2006.01)
  *G06T 15/00* (2011.01)
  *G06T 15/04* (2011.01)

(52) U.S. Cl.
  CPC .......... *G06T 15/005* (2013.01); *G06T 15/04* (2013.01)

(58) Field of Classification Search
  CPC .... G06F 12/0804; G06F 13/28; G06F 3/0656; G06F 3/011; G06F 3/012; G06F 3/04815;
  (Continued)

(56) References Cited

U.S. PATENT DOCUMENTS 7,525,547 B1    4/2009 Diard
8,634,431 B1    1/2014 Chiang et al.
(Continued)

FOREIGN PATENT DOCUMENTS

EP    0831424 A2    3/1998
EP    3418879 A1    12/2018
(Continued)

OTHER PUBLICATIONS

International Search Report and Written Opinion of International Application No. PCT/US2020/054937, dated Jan. 22, 2021, 16 pp.

*Primary Examiner* — Hau H Nguyen
(74) *Attorney, Agent, or Firm* — Shumaker & Sieffert, P.A.

(57) ABSTRACT

This disclosure describes efficient communication of surface texture data between system on a chip (SOC) integrated circuits. An example system includes a first integrated circuit and a second integrated circuit communicatively coupled to the first integrated circuit by a video communication interface. The first integrated generates a superframe in a video frame of the video communication interface for transmission to the second integrated circuit. The superframe includes multiple subframe payloads that carry surface texture data to be updated in the frame and corresponding subframe headers that include parameters of the subframe payloads. The second integrated circuit includes a direct access memory (DMA) controller. The DMA upon receipt of the superframe, writes the surface texture data within each of the subframe payloads directly to an allocated location in memory based on the parameters included in the corresponding one of the subframe headers.

18 Claims, 13 Drawing Sheets

(58) Field of Classification Search
CPC ..... H04L 5/0003; H04L 5/0044; H04L 69/22; H04N 19/70; H04N 21/8547; G06T 15/205; G06T 19/006; G09G 2360/122; G09G 5/12

See application file for complete search history.

(56) References Cited

U.S. PATENT DOCUMENTS

| | | | |
|---|---|---|---|
| 8,848,792 | B2 | 9/2014 | MacInnis et al. |
| 10,672,098 | B1* | 6/2020 | Chemparathy ........ G09G 5/001 |
| 2006/0262851 | A1* | 11/2006 | Bakfan .................. G10L 19/00 |
| | | | 375/240.12 |
| 2007/0121638 | A1* | 5/2007 | Szczebak, Jr. .......... H04L 41/00 |
| | | | 370/394 |
| 2007/0171234 | A1 | 7/2007 | Crawfis et al. |
| 2011/0199931 | A1* | 8/2011 | Anderson ............... H04L 69/18 |
| | | | 370/252 |

FOREIGN PATENT DOCUMENTS

| | | |
|---|---|---|
| EP | 3657327 A1 | 5/2020 |
| WO | 2019015591 A1 | 1/2019 |

\* cited by examiner

| VIDEO INTERFACE DATA PORT |||||||||||||||||||||||||||||||||||||
|---|---|---|---|---|---|---|---|---|---|---|---|---|---|---|---|---|---|---|---|---|---|---|---|---|---|---|---|---|---|---|---|---|---|---|---|
| 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| RED |||||||||||| GREEN |||||||||||| BLUE |||||||||||
| 15 | 14 | 13 | 12 | 11 |  |  |  |  |  |  |  | 10 | 9 | 8 | 7 | 6 | 5 |  |  |  |  |  |  | 4 | 3 | 2 | 1 | 0 |  |  |  |  |  |  |  |

FIG. 9A

|  | VIDEO INTERFACE DATA PORT 1 | VIDEO INTERFACE DATA PORT 0 ||
|---|---|---|---|
| HEADER DATA | B3 | B2 | B1 | B0 |
| PIXEL DATA | RED | GREEN | BLUE | ALPHA |

FIG. 9B

ARTIFICIAL REALITY SYSTEM USING SUPERFRAMES TO COMMUNICATE SURFACE DATA

This application claims the benefit of U.S. Provisional Patent Application No. 62/930,493, filed on Nov. 4, 2019, the entire contents of which is incorporated by reference herein.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes artificial reality (AR) systems and techniques that use a communication protocol designed for transferring video data to communicate non-video surface data for rendering and display of artificial reality (AR) content within a multi-device AR system. An example multi-device AR system includes a system in which a peripheral device operates as a co-processing AR device when paired with one or more head-mounted displays (HMDs). For example, as further described herein, the peripheral device and each HMD may each include one or more System on a Chip (SoC) integrated circuits (referred to herein as "SoCs" or "SoC integrated circuits") that are collectively configured to provide an artificial reality application execution environment.

Various examples of an artificial reality (AR) system described herein use a video data communication protocol to communicate raw surface (or texture) data from an application processor to storage via a direct memory access (DMA) controller. Typically, the video data communication protocol carries video pixel data used to directly drive a display. In this disclosure, the video data communication protocol is leveraged within a peripheral device of the AR system to carry raw surface data in order to enable later rendering of an AR scene for display on a head-mounted display (HMD) of the AR system.

In traditional display graphics processing (e.g., in all non-AR systems), all surfaces are composited within the application processor to form the output display frames which are then transmitted to one or more displays. For AR systems, individual surfaces are generated by the application processor and compositing is performed in the final stage of the graphics pipeline requiring the individual surfaces to be transmitted across the system. The composite images are transmitted to one or more displays (e.g., via an AR co-processing SoC integrated circuit). However, in a distributed system, SoC integrated circuits that perform video processing and the SoC integrated circuit that controls image compositing and the display may be separated across one or more devices. Additionally, as AR scenes become more complex, communication bandwidth constraints may prevent a large amount of data from being reliably communicated from the application unit to the display at the rate (e.g., 60 times per second) necessary to create a smooth visual experience for a user.

When constructing the AR content to be displayed, an application may have a combination of animated images that change frequently and static images that do not change frequently. For example, a player avatar may change to correspond with movements of the user and a store sign may not change during the duration of a scene. As described below, the application SoC integrated circuit uses the video data communication protocol to transmit data that the communication protocol is not designed to carry. The application SoC integrated circuit leverages the fact that not all surfaces of interest in an AR scene need to change with every frame and modifications (e.g., rotation, translations, scaling, etc.) done to the non-updating surfaces due to movement of the HMD can be performed at a later stage (e.g., by display drivers on the HMD, etc.). The application unit uses a general communication protocol (e.g., PCIe, etc.) to transmit a setup frame that defines the surfaces that are to be displayed and a video data transfer protocol (e.g., MIPI DSI, etc.) to send raw surface data that includes data for only surfaces that will update in the next display cycle.

The application SoC integrated circuit generates a superframe that includes subframe headers and corresponding subframes. The subframes include raw surface data for each surface to be updated. The headers and subframes are formatted to fit within a message structure of the video data transfer protocol. For each surface to be included, the application SoC circuit generates a subframe header that specifies where the corresponding subframe is within the message structure of the video data transfer protocol. These headers are placed at the beginning of the superframe in a defined location so that the AR co-processing SoC integrated circuit (e.g., via the DMA controller) is able to retrieve subframe characteristics from these headers and subsequently use the subframe characteristics to write the corresponding raw surface data for each subframe into memory.

Using the video data transfer protocol to send the surface updates has several advantages compared to sending the surface updates using the general communication protocol: (a) the video data communication protocol can be put into an idle mode between transmissions to save power; (b) the video data communication protocol is generally more rigidly defined in terms of its structure and timing; and (c) the general communication protocol can manage its bandwidth by changing timing that data is communicated even though the surface updates need to be communicated on a fixed cycle (e.g., 60 times a second).

As used herein, a surface is a graphics texture which has a specified width and height and is assigned a handle identifier (ID). A surface can be updated by being included as a subframe within a superframe. A surface update does not need to occur in every superframe. As used herein, a subframe is one frame of a graphics surface that is assigned a handle ID. Texels of the subframe are encapsulated within a superframe. A "texel" is a unit of texture data and a "pixel" is a unit of image data used for final composited frame that is output to display. Texels of subframe data may be store in a video frame that is defined to use a pixel data structure. As used herein, a superframe is a video communication interface video frame which is used as a container for multiple subframe headers and the corresponding subframe raw texture data payloads.

In one example, an artificial reality system includes a first integrated circuit and a second integrated circuit communicatively coupled to the first integrated circuit by a video communication interface. The first integrated circuit includes at least one processor and generates a superframe in a video frame of the video communication interface for transmission to the second integrated circuit. The superframe includes multiple subframe payloads that carry surface texture data to be updated in the frame and corresponding subframe headers that include parameters of the subframe payloads. The second integrated circuit comprises a direct access memory (DMA) controller, and, upon receipt of the superframe, writes the surface texture data within each of the subframe payloads directly to an allocated location in memory based on the parameters included in the corresponding one of the subframe headers. The second integrated circuit also transmits the surface texture data from the memory to a display device to be rendered for display.

In another example, a method includes generating, by a first integrated circuit of an artificial reality (AR) system, a superframe in a video frame of a video communication interface for transmission to a second integrated circuit of the AR system. The superframe includes multiple subframe payloads that carry surface texture data to be updated in the frame and corresponding subframe headers that include parameters of the subframe payloads The method also includes, upon receipt of the superframe, writing, by a direct access memory (DMA) controller of the second integrated circuit, the surface texture data within each of the subframe payloads directly to an allocated location in memory based on the parameters included in the corresponding one of the subframe headers. Additionally, the method includes transmitting, by the second integrated circuit, the surface texture data from the memory to a display device to be rendered for display.

In another example, a computer-readable storage medium comprising instructions that, when executed, configure processing circuitry of a computing system to: for every frame to be displayed by a display device, generate, by a first integrated circuit of an artificial reality (AR) system, a superframe in a video frame of a video communication interface for transmission to a second integrated circuit of the AR system. The superframe includes multiple subframe payloads that carry surface texture data to be updated in the frame and corresponding subframe headers that include parameters of the subframe payloads. Upon receipt of the superframe, the computer system is configured to write, by a direct access memory (DMA) controller of the second integrated circuit, the surface texture data within each of the subframe payloads directly to an allocated location in memory based on the parameters included in the corresponding one of the subframe headers. The computer system is configured to transmit, by the second integrated circuit, the surface texture data from the memory to a display device to be rendered for display.

The details of one or more examples are set forth in the accompanying drawings and the description below. Other features, objects, and advantages will be apparent from the description and drawings, and from the claims.

BRIEF DESCRIPTION OF DRAWINGS

FIG. 9A is a diagram that illustrates an example format of pixel data on a video communication interface port.

FIG. 9B is a diagram that illustrates an example of remapped pixel data from video communication interface ports to header data and pixel data of a subframe surface payload data.

DETAILED DESCRIPTION

Figure 1A:
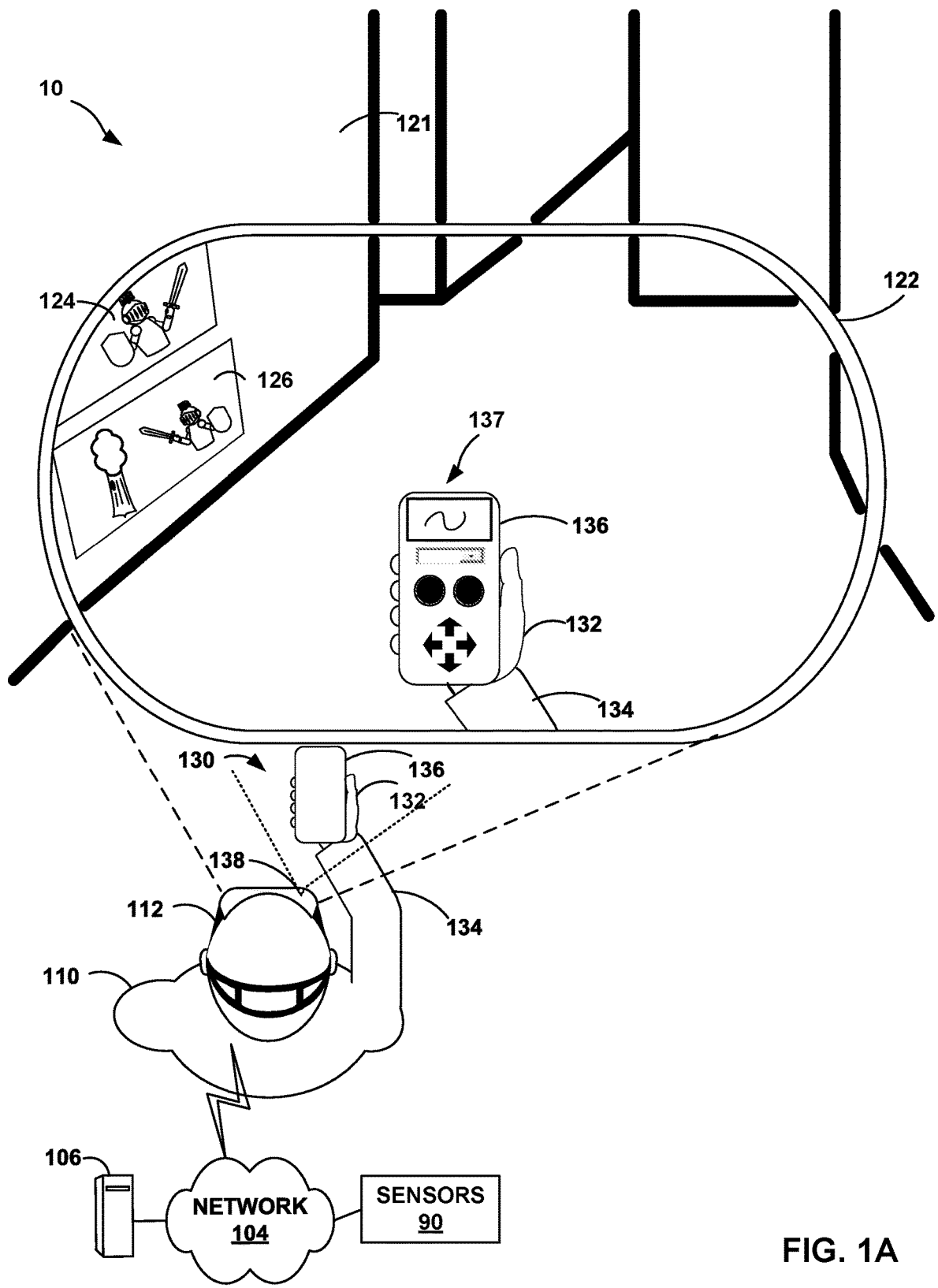
FIG. 1A is an illustration depicting an example multi-device artificial reality system operating in accordance with the techniques described in this disclosure.

FIG. 1A is an illustration depicting an example multi-device artificial reality system 10 that generates artificial reality (AR) content in accordance with the techniques described in this disclosure. In the example of FIG. 1A, artificial reality system 10 includes head mounted display (HMD) 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) displayed on actual and/or defined surfaces to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on the surface of a physical object or on a surface defined in relation to a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smart ring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SOC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In accordance with the techniques of this disclosure, artificial reality system 10 may provide efficient transfer of raw surface data used to generate the AR content between different SoCs within the peripheral device 136. For intra-device surface texture communication, the peripheral device 136 leverages the fact that some surface texture to be displayed by the HMD 112 change often (e.g., every video frame, etc.) (sometimes referred to as "dynamic") and some surface textures are static. The peripheral device 136 uses a video communication interface that transmits video frames to perform intra-device surface texture communication. The video frames are transformed to become superframes that include multiple subframes of surface texture data. Each superframe only includes subframes of surface texture data of surface textures that will change in the next displayed video frame. These methods facilitate a longer battery life and better bandwidth management of the communication interfaces that connect the SoCs within the peripheral device 136.

Figure 1B:
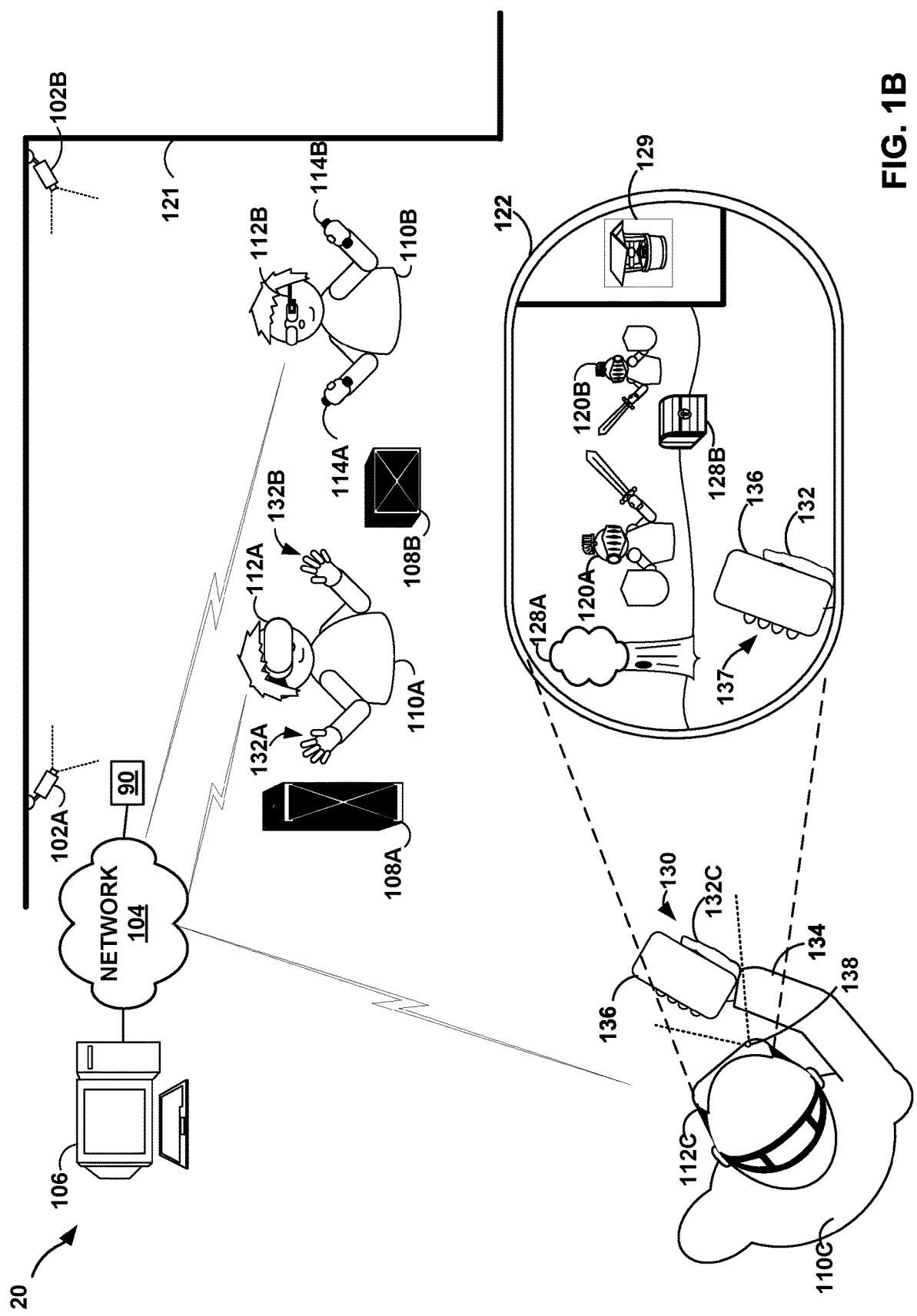
FIG. 1B is an illustration depicting another example multi-device artificial reality system operating in accordance with techniques described in this disclosure.

FIG. 1B is an illustration depicting another example multi-device artificial reality system 20 operating in accordance with the techniques described in this disclosure. Similar to artificial reality system 10 of FIG. 1A, in some examples, artificial reality system 20 of FIG. 1B may generate and render virtual content items with respect to a virtual surface within a multi-user artificial reality environment. The virtual surfaces may correspond to actual surfaces (e.g., planes define at least partially to wall or tables, etc.) or to defined surfaces (e.g., planes defined in space anchored to a particular set of coordinates, etc.). The artificial reality system 20 renders the virtual content items using surface textures that are rendered to appear to the users to be affixed to or incorporated into the virtual surface. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively. Some of the virtual objects 128 are static textures that do not change with every video frame. For example, a virtual object depicting a tree (e.g., virtual object 128A, etc.) may rarely change surface textures. Other virtual objects 128 may be dynamic and change often (e.g., animated such that the surface texture changes every video frame). While other virtual objects 128 may have periods of being static and periods of being dynamic. For example, a treasure chest (e.g., virtual object 128B) may be static until interacted with, become dynamic as it is animated to open, and return to being static after it is open.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B.

Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of a surface defined in relation to wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A.

Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits (e.g., the SoC integrated circuits 510A and 510B of FIG. 5 below) configured to enable an operating environment for artificial reality applications.

To reduce the bandwidth used by the graphics pipeline (e.g., the internal system of memory management, processing, and transmission to display a surface texture generated by the console 106 on the HMD 112, etc.), at least some of the surface textures associated with the virtual objects 128 or the virtual content items 129 of FIG. 1B are transmitted internally using a video frame of a video communication interface transformed into a superframe that carries multiple subframes of surface texture data. The superframe only includes subframes for surface texture data that will change in the next video frame to be displayed by the HMD 112.

Figure 2A:
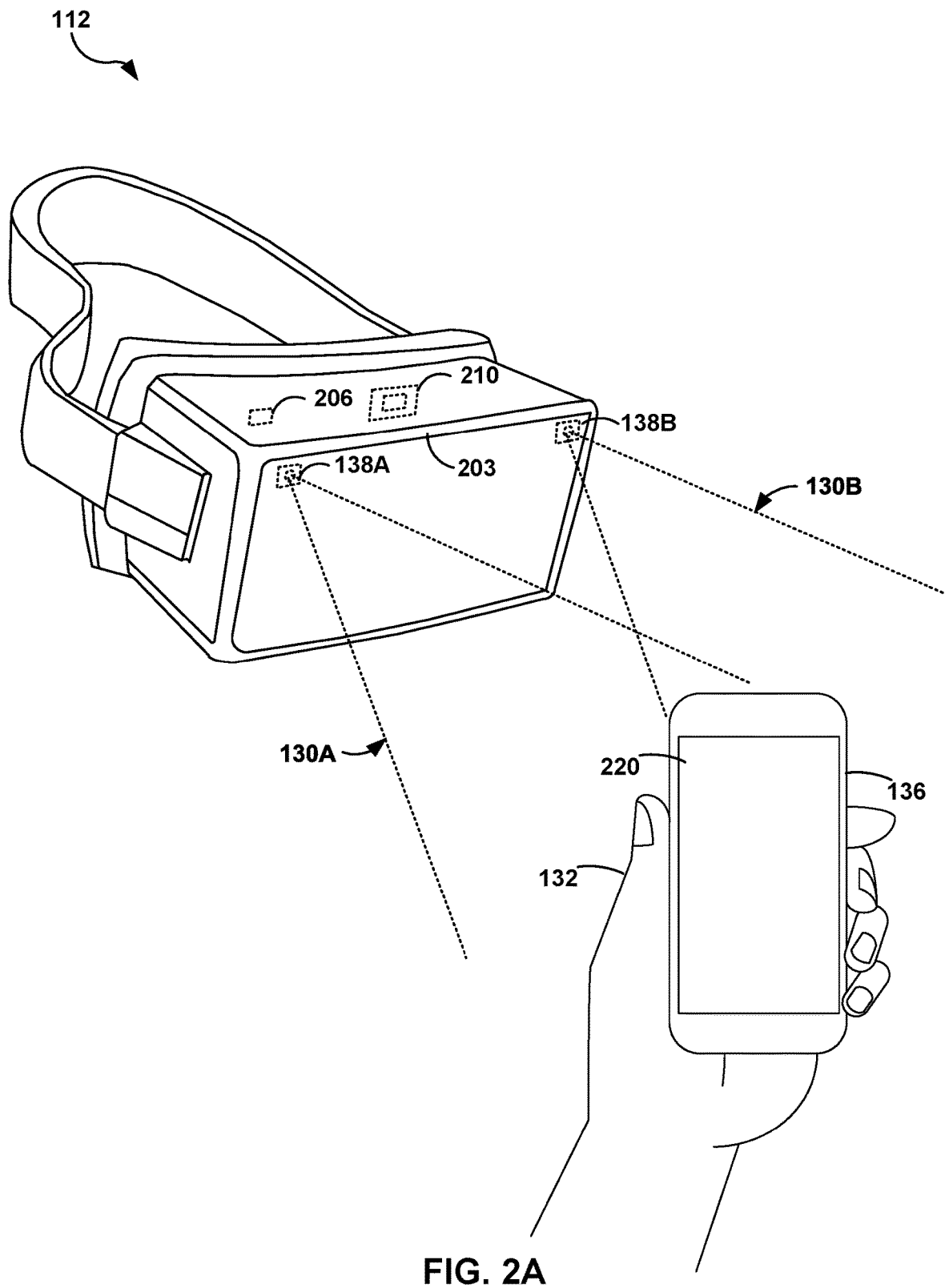
FIG. 2A is an illustration depicting an example head mounted display (HMD) and an example peripheral device operating in accordance with techniques described in this disclosure.

FIG. 2A is an illustration depicting an example HMD 112 and an example peripheral device 136, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 2B:
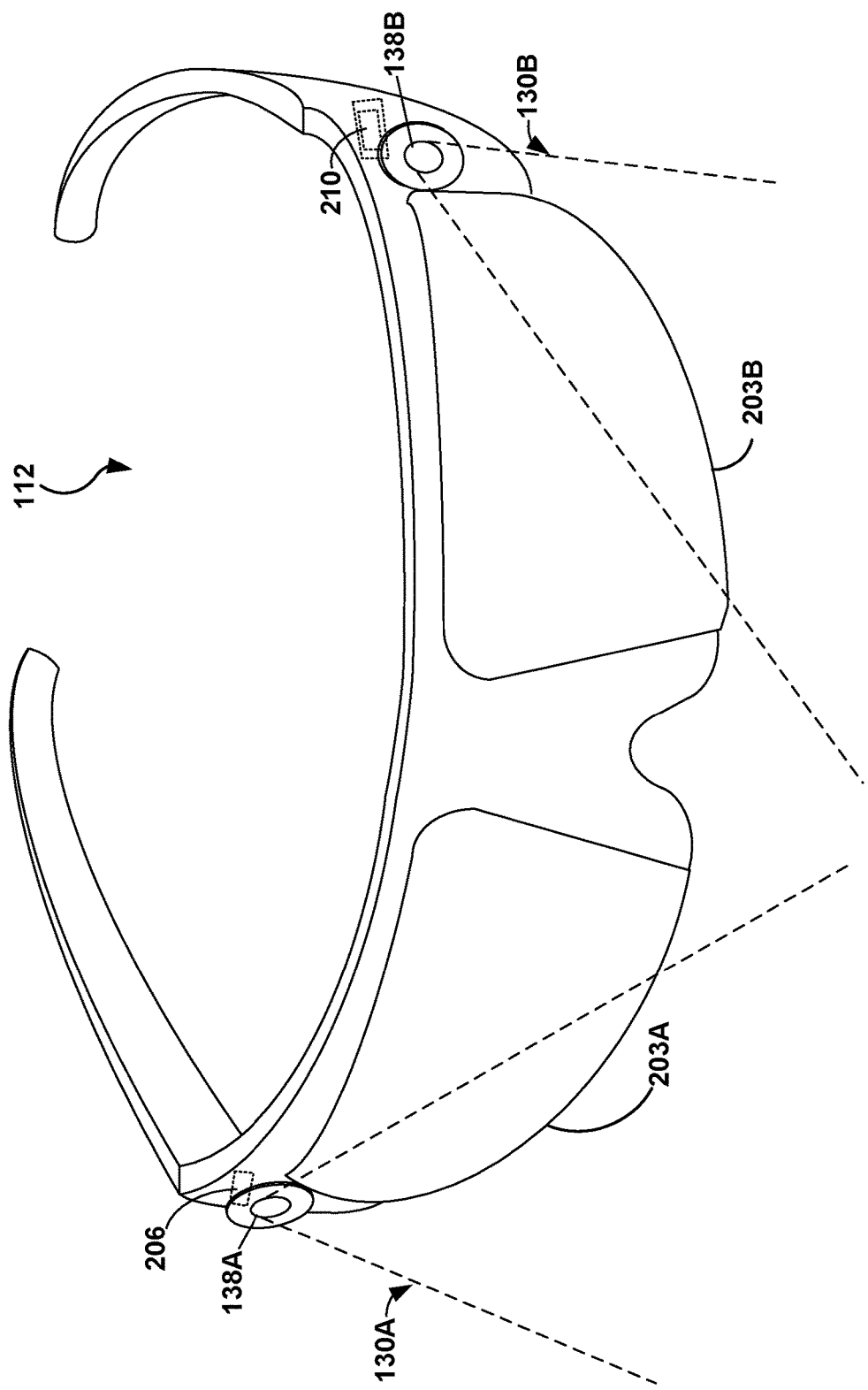
FIG. 2B is an illustration depicting another example HMD operating in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

To reduce the bandwidth used by the graphics pipeline (e.g., the internal system of memory management, processing, and transmission to display a surface texture generated by the peripheral device 136 on the HMD 112, etc.), at least some of the surface textures associated with virtual objects displayed by the HMD 112 are transmitted internally using a video frame of a video communication interface transformed into a superframe that carries multiple subframes of surface texture data. The superframe only includes subframes for surface texture data that will change in the next video frame to be displayed by the HMD 112 of FIGS. 2A and 2B.

Figure 3:
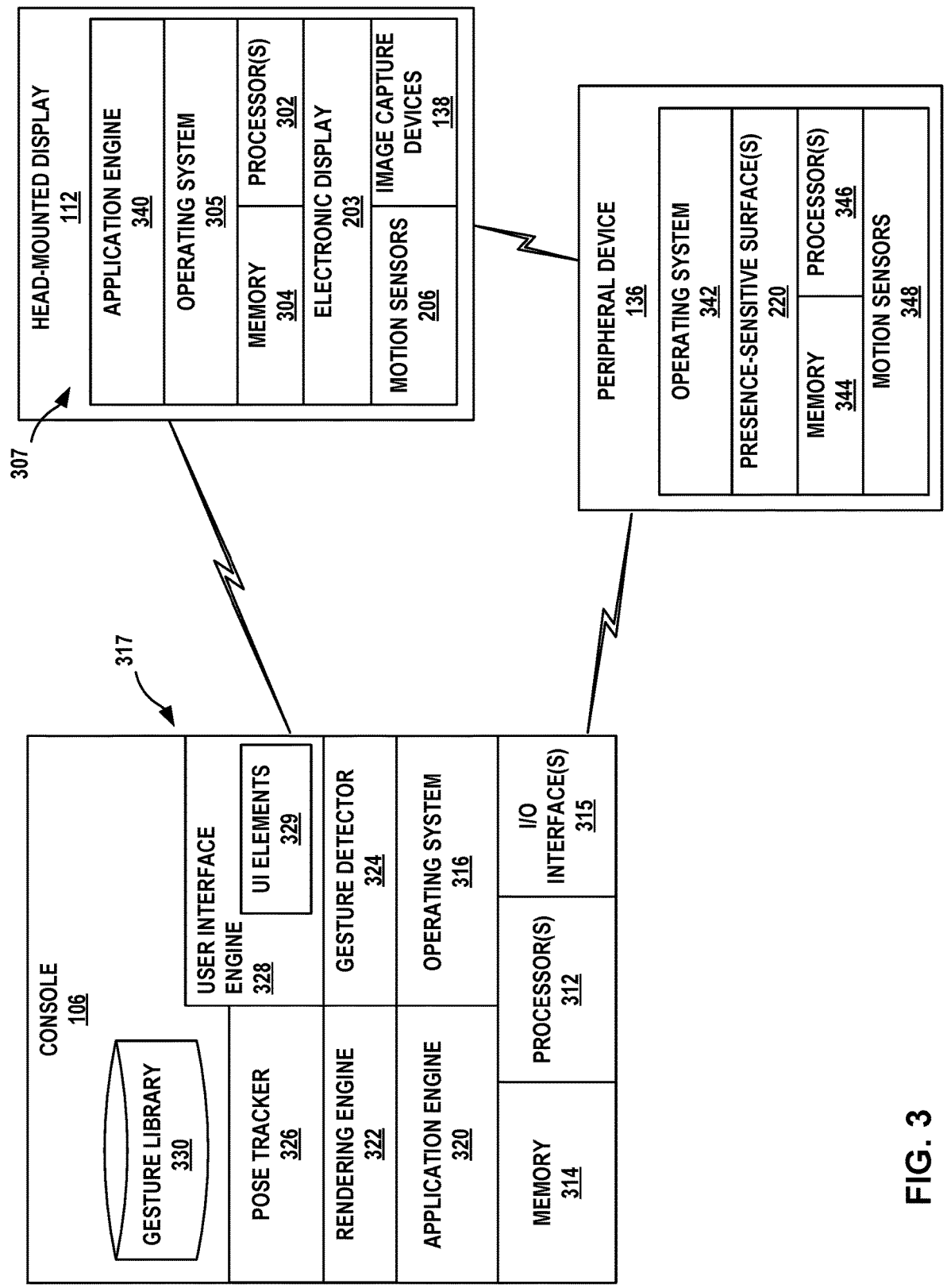
FIG. 3 is a block diagram showing example implementations of a console, an HMD, and a peripheral device of the multi-device artificial reality systems of FIGS. 1A and 1B operating in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or image capture devices 138 of HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110. Pose tracker 326 may also determine a current pose for peripheral device 136 and, in accordance with the current pose, triggers certain functionality associated with any rendered virtual content).

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330. Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112.

As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In the illustrated example, the peripheral device 136 receives surface texture data from the console 106, processes the surface texture data (e.g., using the processors 346), and transmits the processed surface texture data to the HMD 112 to be displayed on the electronic display 203. The peripheral device 136 includes a graphics pipeline that selectively communicates the surface texture data to the HMD based on whether the surface texture data is to change in the next video frame to be displayed on the electronic display 203. The graphics pipeline determines whether surface texture data is to change and prepares a subframe and subframe header for that surface texture data. The graphics pipeline internally transmits a video frame that includes multiple subframes to reduce the amount of internal data transmitted by the peripheral device 136.

Figure 4:
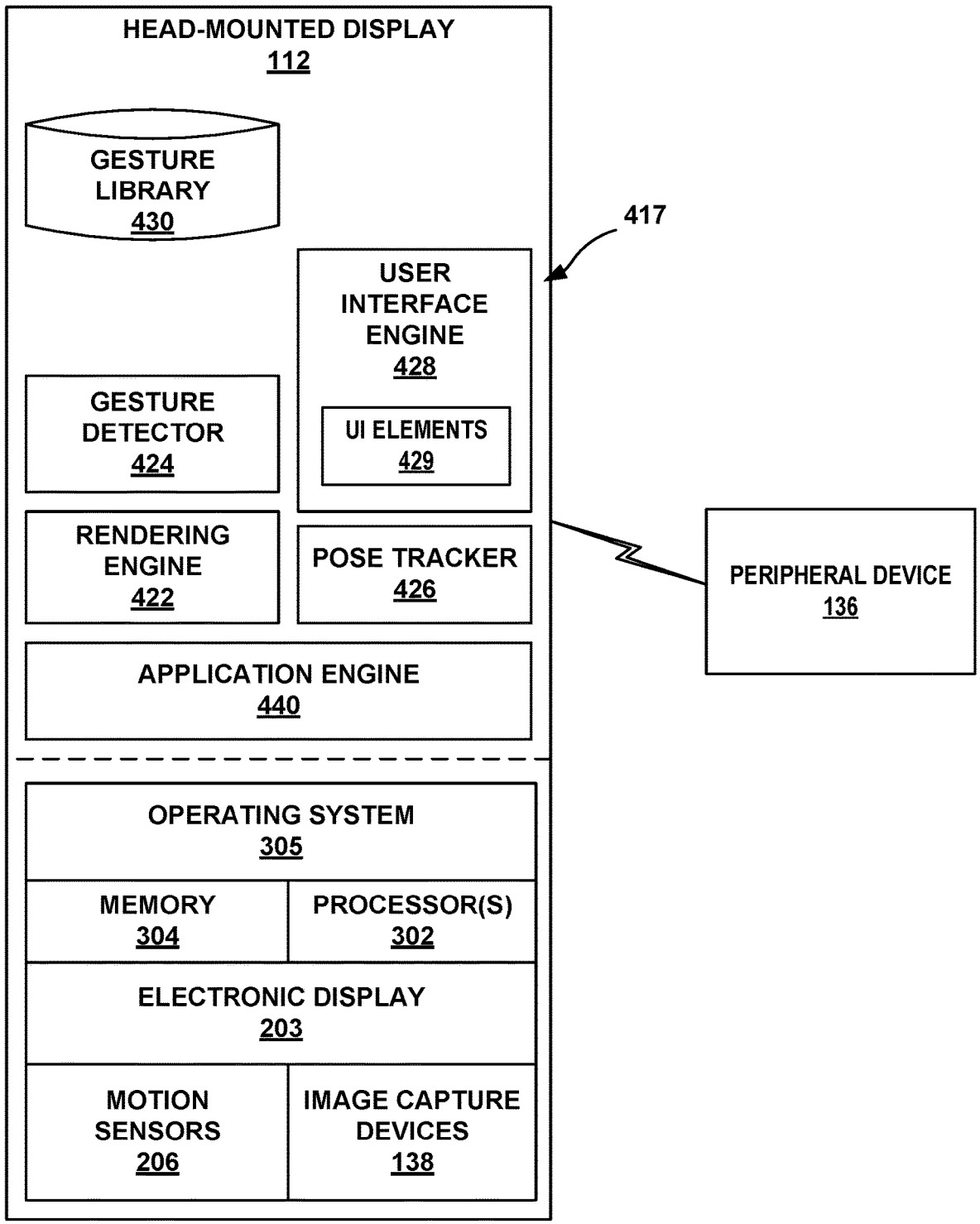
FIG. 4 is a block diagram depicting example implementations of an HMD and a peripheral device of the multi-device artificial reality systems of FIGS. 1A and 1B operating in accordance with the techniques described in this disclosure.

FIG. 4 is a block diagram depicting example implementations of an HMD and a peripheral device of the multi-device artificial reality systems of FIGS. 1A, 1B in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

As described in FIG. 3, the graphics pipeline of the peripheral device 136 selectively internally transmits surface data. As a result, for each video frame, the peripheral device 136 transmits fewer than all of the surface textures in each video frame that are to be displayed by the electronic display 302.

Figure 5:
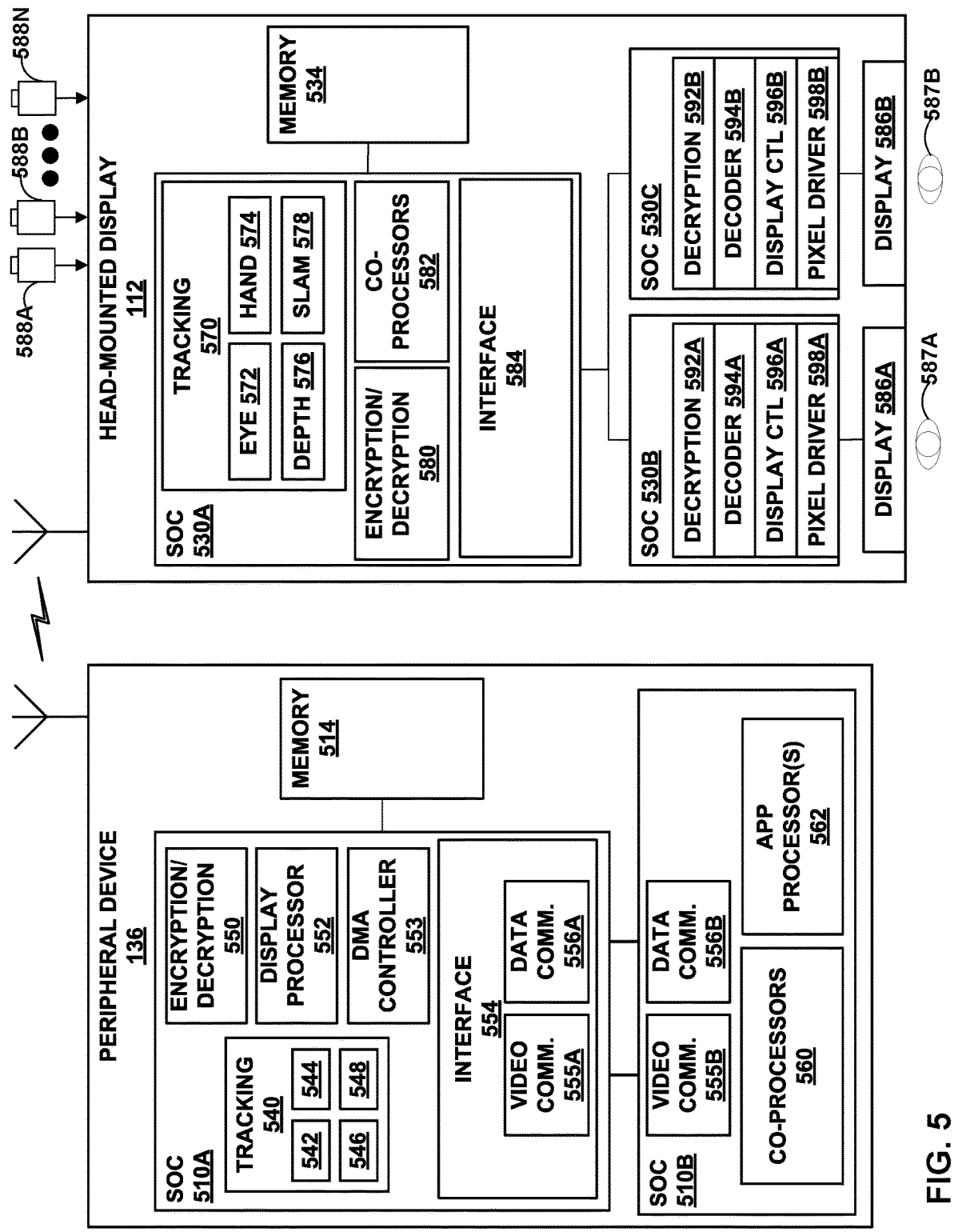
FIG. 5 is a block diagram illustrating a more detailed example implementation of a distributed architecture for a multi-device artificial reality system in which one or more devices (e.g., peripheral device and HMD) are implemented using one or more System on a Chip (SoC) integrated circuits within each device, in accordance with the techniques described in this disclosure.

FIG. 5 is a block diagram illustrating an example implementation of a distributed architecture for a multi-device artificial reality system in which one or more devices (e.g., peripheral device 136 and HMD 112) are implemented using one or more SoC integrated circuits within each device. As described, peripheral device 136 and HMD 112 are architected and configured to enable efficient communication of surface texture data between the devices in the multi-device artificial reality system.

In general, the SoCs illustrated in FIG. 5 represent a collection of specialized integrated circuits arranged in a distributed architecture, where each SoC integrated circuit includes various specialized functional blocks configured to provide an operating environment for artificial reality applications. FIG. 5 is merely one example arrangement of SoC integrated circuits. The distributed architecture for a multi-device artificial reality system may include any collection and/or arrangement of SoC integrated circuits.

In this example, SoC 530A of HMD 112 (sometimes referred to as the "AR central processing SoC") comprises functional blocks including security processor 224, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 is a functional block to encrypt outgoing data communicated to peripheral device 136 and decrypt incoming data communicated from peripheral device 136. Encryption/decryption 580 may support symmetric key cryptography to encrypt/decrypt data with a session key (e.g., secret symmetric key). Encryption/decryption 580 facilitates secure communication between, for example, the peripheral device 136 and the head-mounted display 112.

Co-application processors 582 includes various processors such as a video processing unit, graphics processing unit, digital signal processors, encoders and/or decoders, and/or others.

Interface 584 is a functional block that includes one or more interfaces for connecting to functional blocks of AR central processing SoC 530A. As one example, interface 584 may include peripheral component interconnect express (PCIe) slots. AR central processing SoC 530A may connect with SoCs 530B and 530C using interface 584. AR central processing SoC 530A may connect with a communication device (e.g., radio transmitter) using interface 584 for communicating with other devices, e.g., peripheral device 136.

SoCs 530B and 530C (sometimes referred to as the "display SoCs") each represents display controllers for outputting artificial reality content on respective displays, e.g., displays 586A, 586B (collectively, "displays 586"). In this example, display SoC 530B may include a display controller for display 568A to output artificial reality content for a left eye 587A of a user. For example, display SoC 530B includes a decryption block 592A, decoder block 594A, display controller 596A, and/or a pixel driver 598A for outputting artificial reality content on display 586A. Similarly, display SoC 530C may include a display controller for display 568B to output artificial reality content for a right eye 587B of the user. For example, display SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 510A and 510B configured to support an artificial reality application. In this example, SoC 510A (sometimes referred to as the "AR co-processing SoC") comprises functional blocks including security processor 226, tracking 540, an encryption/decryption 550, a display processor 552, a DMA controller 553, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Encryption/decryption 550 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key). Encryption/decryption 550 facilitates secure communication between, for example, the peripheral device 136 and the head-mounted display 112.

Display processor 552 includes one or more processors such as a video processing unit, graphics processing unit, encoders and/or decoders, and/or others, for rendering artificial reality content to HMD 112.

The DMA controller 553 transfers data to and from the interface 554 and stores that data in the memory 514. Data received on the interface 554 may include information (e.g., in a header) that informs the DMA controller 553 wherein in the memory 415 to store the received data. For example, the DMA controller 553 may access a table that associates a specific location in memory with an identifier for a surface texture so that when a header includes that identifier, the DMA controller 553 stores the accompanying data in the specified location in memory. The DMS controller 553 includes status and control (SC) registers that store information (e.g., subframe headers, current frame number, super frame identifiers, color space conversion matrix coefficients, starting and current memory addresses for surface data, etc.) and controls (e.g. interrupt controls, superframe commands, etc.) used to process superframes and store the surface texture data in the appropriate location in the memory 514.

Interface 554 includes one or more interfaces for connecting to functional blocks of AR co-processing SoC 510A. As one example, interface 554 may include peripheral component interconnect express (PCIe) slots. AR co-processing SoC 510A may connect with SoC 510B using interface 554. AR co-processing SoC 510A may connect with one or more communication devices (e.g., radio transmitter) using interface 554 for communicating with other devices, e.g., HMD 112. In the illustrated example, the interface 554 includes a video communication interface 555A and a data communication interface 556A. The video communication interface 555A is communicatively coupled to a video communication interface 555B located within the SoC 510B. The video communication interfaces 555A and 555B are structured to communicate a video data protocol with messages that include pixel data representing surfaces to be rendered for display on a display device (such as the displays 586A and 586B of HMD 112). In some examples, the video communication interfaces 555A and 555B implement a Display Serial Interface (DSI) as specified by the Mobile Industry Processor Interface (MIPI) Alliance (sometimes referred to as "MIPI DSI"). In some examples, the video communication interfaces 555A and 555B include (a) an interface that may be placed in a low power mode when no pixel data is being transmitted, (b) has a message structure that, once defined, is rigid, and (c) has a defined transmission timing. The data communication interface 556A is communicatively coupled to a data communication interface 556B located within SoC 510B. The data communication interfaces 556A and 556B are structured to communicate data regardless of the content of the data. In some examples, the data communication interfaces 556A and 556B implement the Peripheral Component Interconnect Express (PCIe) interface.

SoC 510B (sometimes referred to as the "application SoC") includes co-application processors 560, application processors 562, video communication interface 555B, and data communication interface 556B. The application SoC 510B renders surface textures for multiple surfaces that are sent to the HMD 112 to be displayed to the user. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 136 and/or to detect gestures performed by a user with respect to peripheral device 136. The application processors 562 may include a unit to composite surface textures into a superframe that are sent to the AR central processing SoC 510A via the video communication interface 555B.

For each video frame, the application SoC 510B generates a superframe with superframe header and a subframe header and a subframe payload for each surface texture to be rendered by the head-mounted display 112. The application SoC 510B increments a counter that is part of the superframe header. In some examples, the application SoC 510B generates the superframe with only the surface texture data of the surface textures that update in the next video frame. In some examples, if none of the surface textures are to be updated, the application SoC 510B either (a) sends the same superframe as the last video frame without incrementing the counter, or (b) sends a superframe without any subframe headers/payloads. The application SoC 510B forwards the superframe over the video communication interface 555B.

The AR central processing SoC 510A drops the superframe if the counter has not changed. The AR central processing SoC 510A, using a DMA controller, (a) stores the information in the superframe header into the memory 514 and stores the subframe headers and subframe payloads into the memory 514. The AR central processing SoC 510A (a) looks up a compression state, (b) compresses the subsurface payloads, and (c) provides the compressed subsurface payloads to the radio for transmission to the HMD 112.

Figure 6:
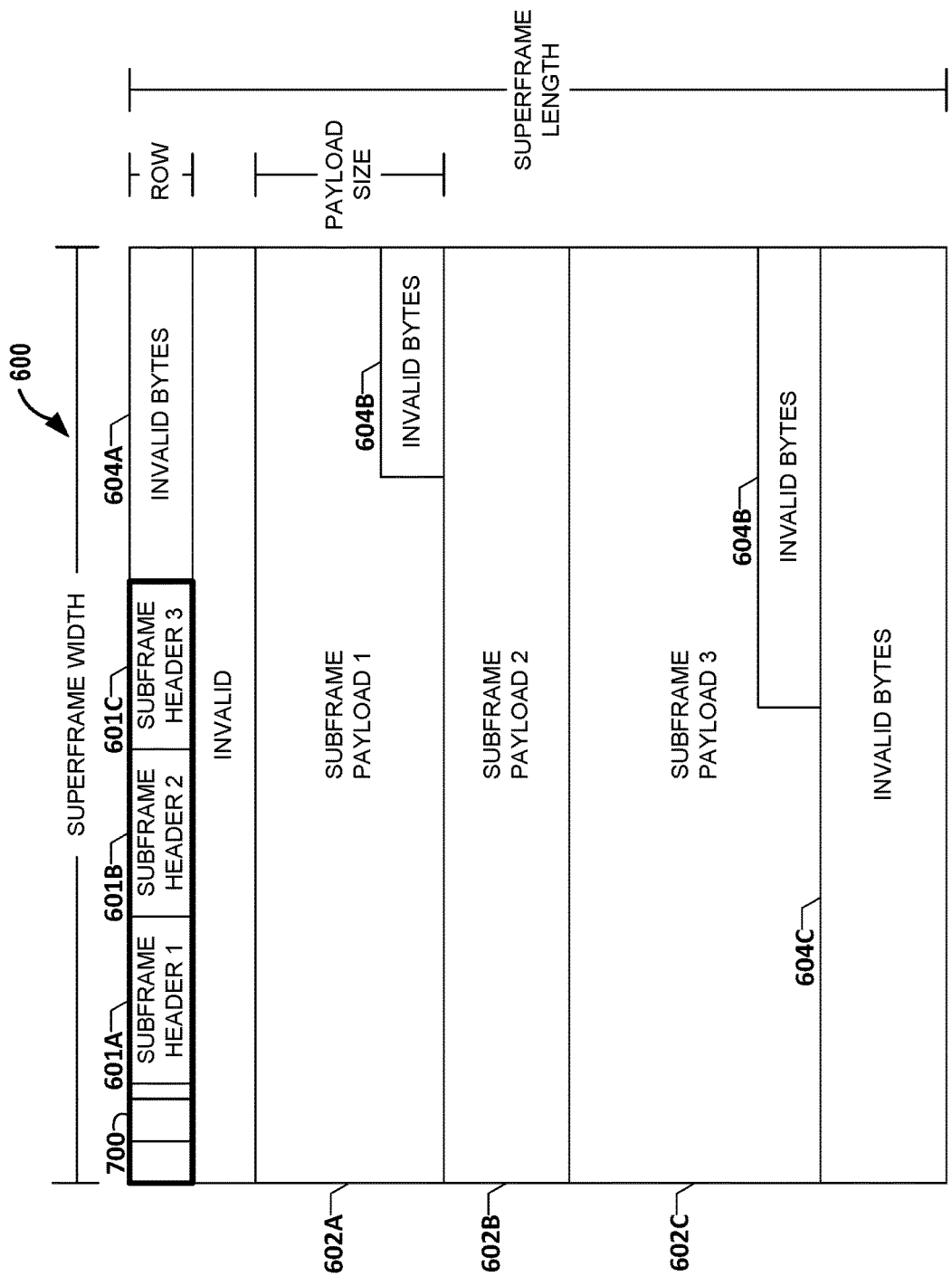
FIG. 6 is a diagram illustrating a superframe containing subframes of raw texture data structured to fit within a message format of a video communication interface.
Figure 7:
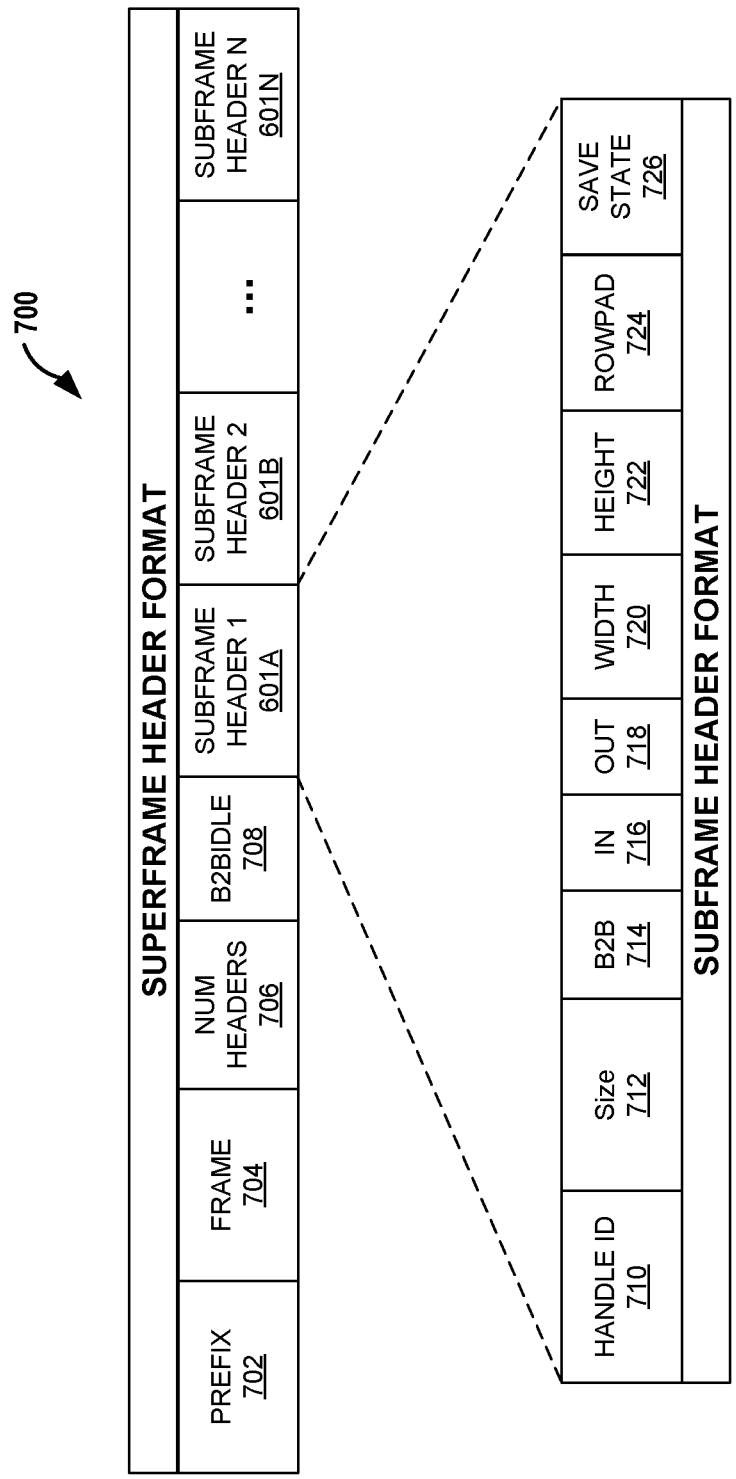
FIG. 7 illustrates an example format of a header of the superframe of FIG. 6 and an example format of a header of the one or more subframes that are included in the header of the superframe.

FIG. 6 is a diagram illustrating a superframe 600 containing subframe headers 601A-601C (collectively, "subframe headers 601") and corresponding subframe payloads 602A-602C (collectively, "subframe payloads 602") of raw texture data structured to fit within a message format of a video communication interface. The subframe headers 601 are placed at the start of each superframe within a superframe header 700 to facilitate the subframe headers 601 being extracted in a first processing step. The superframe 600 has a defined width (number of bytes per row) and height (number of rows). The first row of the superframe 600 contains the superframe header 700. An example of the superframe header 700 is shown in FIG. 7. In the illustrated example of FIG. 7, the superframe header 700 includes a signature prefix code 702, a frame ID 704, a NUMHEADERS field 706, a B2BIDLE field 708, and one or more subframe headers 601A though 601N (collectively referred to as "subframe headers 601"). The application SoC 510B may define any number of surface textures (e.g., the pre-defined number of subframe headers 601 and payloads 602 is static, etc.). However, a subframe 600 may only include subframe headers 601 and subframe payloads 602 for a few of the total number of textures (e.g., only for the surface textures that have changed since the last video frame, etc.).

The signature prefix code 702 is a unique signature to indicate a valid frame. The DMA controller 553 of the receiving SoC (e.g., the AR coprocessing SoC 510A, etc.) ignores the superframe 600 unless this prefix matches a pre-defined SIGNATURE value. The frame ID 704 is an incrementing frame number. Except for the first superframe after the DMA controller is enabled, this field must be different from the last superframe's FRAME value, otherwise the DMA controller ignores the superframe 600. The signature prefix code 702 and the frame ID 704 may be collectively referred to as "validity fields." The NUMHEADERS field 706 contains the number of subframe payloads 602 within the superframe 600. The B2BIDLE field 708 contains the number of empty or idle rows (indicated as "invalid bytes 604A" in FIG. 6) between the subframe header 700 and the first subframe payload 602A within the superframe 600. Because the superframe 600 has a defined length, any unused bytes at the end of the frame are ignored (indicated as "invalid bytes 604C" in FIG. 6).

Each subframe header 601 describes the characteristics of the corresponding subframe payload 602. For example, the subframe header 601 may include the length (in pixels, etc.) of the subframe payload 602, dimensions of the subframe surface texture stored as the subframe payload 602, subframe data formats, and processing tags, etc. The subframe headers 601 are parsed to generate DMA commands that handle (e.g., retrieve, transform, store in memory, etc.) the corresponding subframe payloads 602 that are packed in the superframe 600 after the superframe header 700. Each surface texture to be updated in the next video frame is included in the superframe header 700 as a subframe header 601 and a subframe payload 602. The subframe headers 601 contain parameters for handling the subframe payload 602 at the destination. The subframe payload 602 includes the pixel data for the surface texture to be updated. An example of the subframe header 601 is shown in FIG. 7. In the illustrated example of FIG. 7, the subframe header includes an ID field 710, a size field 712, a B2B field 714, an IN_FORMAT field 716, an OUT_FORMAT field 718, a width field 720, a height field 722, a ROWPAD field 724, and a SAVE STATE field 726.

The ID field 710 contains the handle ID of the corresponding surface. The size field 712 contains a size (e.g., in bytes) of the surface data payload in the corresponding subframe 602. The B2B field 714 contains a number of idle (e.g. empty) rows in superframe to next subframe payload 602. Because each subframe starts at the beginning of a superframe row, the B2B field 714 indicates how many superframe rows are to be skipped after the row of the superframe that contains the last pixel data of the corresponding subframe.

The IN_FORMAT field 716 contains a pixel input format (e.g., X8 (raw data, single channel monochrome), RGBA8888 (with an Alpha channel to be extracted), or RGBX8888, etc.) of the corresponding subframe payload 602. The OUT_FORMAT field 718 contains a pixel output format (e.g., X8 (raw data, single channel monochrome), Semi-Planar YUV 4:2:0 (using CSC plus downscaler), Semi-Planar GRB 4:2:0 (bypass CSC, using downscaler), RGBA (bypass CSC and downscaler, write all data to one address region), RGB 4:4:4 (write R, G, B to planar memory regions), YUV 4:4:4 (use CSC, write Y, U, V to planar memory regions), etc.) to use to store the corresponding subframe payload 602 (e.g., by the DMA controller of the receiving SoC). The DMA controller can write the surface pixel data contained in the subframe payload 602 to multiple possible buffer regions depending on the OUT_FORMAT field. For each of these address regions, there is a START_ADDR control register and a CUR_ADDR status register. The START_ADDR registers are captured when the subframe header data is read for the superframe (at the start of superframe processing). As data is written to a buffer region, the CUR_ADDR status register is updated with the current address to which texture pixel data is being written. The specific processing of the subframe pixel data depends on the input format and/or the output format. For example, in the case of an RGBA subframe (as specified by the IN_FORMAT field 716) and a SPLIT_ALPHA_CHANNEL control bit being set to 1, the Alpha channel in the low order portion (e.g., byte) of each pixel data within the subframe payload 602 is written to another specified memory region (ALPHA START_ADDR). For RGBA output format (OUT_FORMAT field 718), all the pixel data (including the Alpha byte) is written to the RGBA memory region as this is the expected memory format for the video encoder. The RGBA output format is 32-bit packed pixel format containing RED, GREEN, BLUE, and ALPHA channels (8-bits each). The ALPHA channel is a pixel channel used for blending overlapping surfaces onto display, The width field 720 contains the width of the surface (e.g., in pixels). The height field 722 includes the height of the surface (e.g., in pixels).

The ROWPAD field 724 contains a number of bytes at the end of final row of the subframe payload 602 that is to be ignored (indicated as "invalid bytes 604B" in FIG. 6). This ensures that each row of pixels in the superframe 600 are aligned to a fixed boundary (e.g., 16 pixels worth of data per row). If the sub-frame width is not a multiple of this fixed boundary, then padding is inserted at the end of each output pixel row in memory such that each row contains a multiple of the fixed boundary. For example, if the last row of the subframe data has 14 pixels and the fixed boundary is defined as 16 pixels, the ROWPAD would be 2 pixels. In some examples, for packed buffers (Y, UV, ALPHA, RED, GREEN, BLUE), each output pixel row is a multiple of 16 bytes. As anther example, for the 32-bit RGBA format, each output pixel row is a multiple of 64 bytes.

The SAVE STATE field 726 contains pass-thru state data used by downstream processing.

Figure 8:
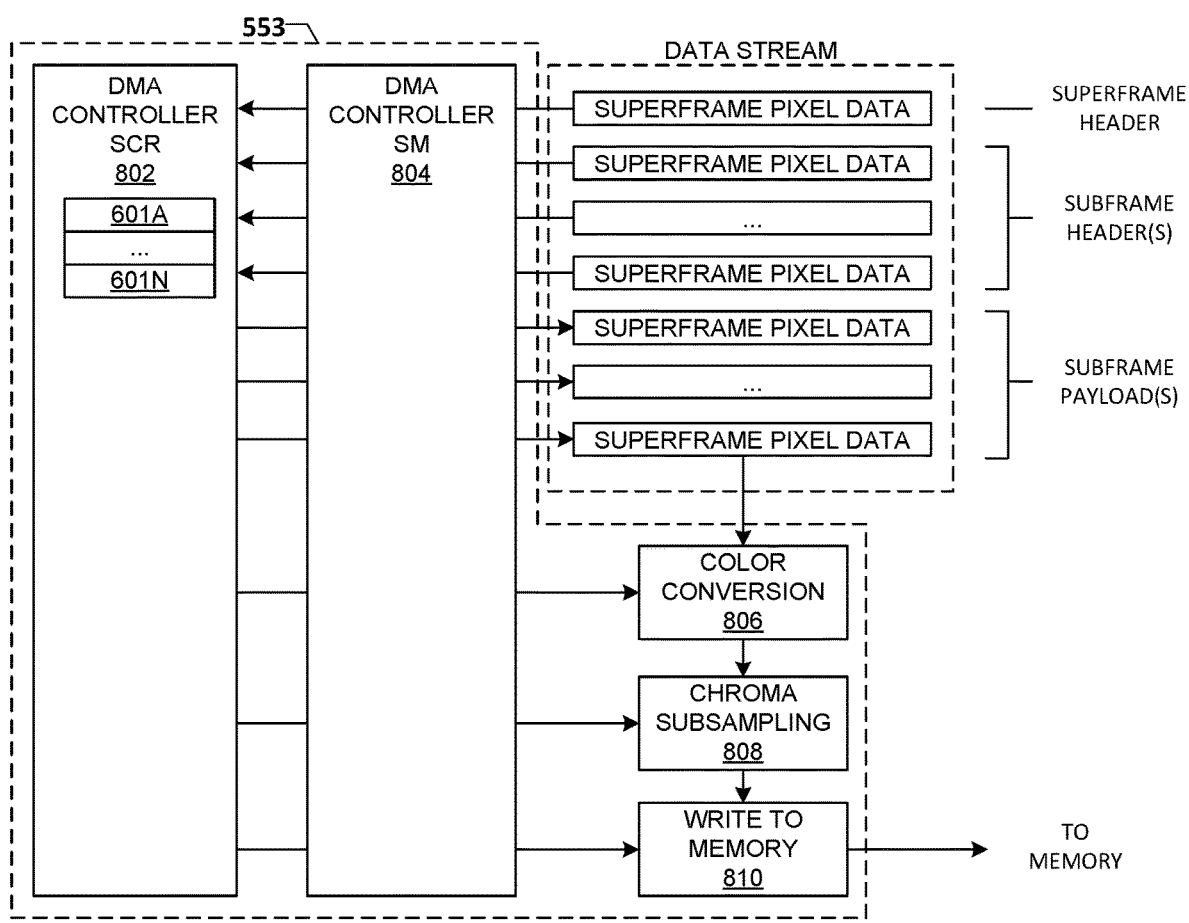
FIG. 8 is a block diagram illustrating a data path for a direct memory access (DMA) controller of an artificial reality (AR) co-processing SoC integrated circuit to directly store the subframe data from a superframe received via the video communication interface.

FIG. 8 is a block diagram of a data path for the DMA controller 553 of the AR co-processing SoC 510A to move the surface textures in the subframe data from a superframe 600 received via the video communication interface into memory. The video communication interface 555A of the AR co-processing SoC 510A traditionally receives video or surface frames from the application SoC 510B over a physical interface (e.g., a 2×4-lane 2.5 Gbps/lane D-PHY interface). Frames are sent in a video mode. Alternatively, in some examples, the frames are sent in a command mode. The video communication interface pixel format is set to a static mode (e.g., a 16-bit-per-pixel RGB565 mode) so that the surface texture data stored in the memory of the application SoC 510B is read and transmitted over the interface without being altered or omitted.

Received video communication data is input to the DMA controller 553 over the video communication interface ports of the video communication interface 555A. In some examples, the video communication interface 555A is configured to output 2 pixels/cycle with each 16-bit pixel extracted as an RGB565 pixel. In such examples, the RGB565 pixel format is used so that all data in a memory region are transmitted with no modifications or omissions. For example, some other known formats either remove portions of the data where the Alpha channel is located or require some image processing within the application SoC's 510B display processing pipeline which would alter the data read from the memory application SoC 510B.

In some examples, the video communication interface 555A has two video interface data ports (sometimes referred to herein for clarity as "VID_P0" and "VID_P1"). In such examples, each video interface data port (e.g., VID_P0 and VID_P1, etc.) is a 36-bit interface that consists of three 12-bit channels (e.g., a RED channel, a GREEN channel, and a BLUE channel). For example, as illustrated in the example in FIG. 9A, the RED channel may encompass bits [35:31], the GREEN channel may encompass bits [23:18], and the BLUE channel may encompass bits [11:7], with bits [30:24], [17:12], and [6:0] being unconnected.

In some examples, after being received, the DMA controller 553 concatenates the data from the video interface data ports (e.g., VID_P0 and VID_P1, etc.) into a full 32-bit word. Two consecutive 16-bit input samples are used to represent an actual RGBA pixel (e.g., Red/Green/Blue/Alpha, 8-bits per channel) in the subframe. As illustrated in the example in FIG. 9B, the DMA controller then remaps this 32-bit value to either be header data (e.g., the superframe header 700) or pixel data that is part of subframe surface payload data (e.g., RGBA data that is part of the subframe surface payload, etc.) (e.g., according to the information provided in the superframe header). For example, when the 32-bit value is remapped to be header data, the first byte (B0) is bits [7;0], the second byte (B1) is bits [15:8], the third byte (B2) is bits [23:16], and the fourth byte (B3) is bits [31:24]. As another example, when the 32-bit value is remapped to be RGBA data that is part of the subframe surface payload, the ALPHA channel is bits [7;0], the BLUE channel is bits [15:8], the GREEN channel is bits [23:16], and the RED channel is bits [31:24].

The DMA controller 553 process received data from the receiving (Rx) ports of the video communication interface 555A and then writes it to memory (e.g., local memory (LMEM) or dynamic random-access memory (DRAM), etc.). For example, the DMA controller 553 may, for a received surface texture, (a) convert the surface texture from an RGBA8888 format to a YUV 4:4:4 format, (b) down sample the YUV 4:4:4 pixels into YUV 4:2:0 pixels and write all the computed YUV 4:2:0 pixels to specified starting memory, and (c) extract and pack the Alpha channel samples from input RGBA pixels and writing the packed Alpha data to another specified starting memory address. To do this, the DMA controller 553 includes circuitry to process and store the received superframes. In the illustrated example, the DMA controller includes a state machine (SM) 804, status and control registers (SCR) 802, a color conversion block 806, a chroma subsampling block 808, and a memory write block 810. The SM 804, the SCR 802, the color conversion block 806, the chroma subsampling block 808, and the memory write block 810 may be implemented in one or more circuits including, integrated circuits, memory, field programmable gate arrays (FPGAs), and/or application-specific integrated circuits (ASICs), etc.

The SCR 802 indicates the current state of the DMA controller 553 and stores the superframe header 700, including the subframe headers 601, to facilitate retrieving and processing the subframe payloads 602. Based on the parameters contained in the superframe header 700 and the subframe headers 601, the SCR 802 populates registers with command values used by the SM 804 to process the superframe 600. For example, starting memory rows for each subframe surface payload are computed from this header data. As each subframe payload is completed, a status count is incremented. The count of remaining payloads in the superframe to be processed by the DMA controller 553 is available in the SCR 802.

The SM 804 uses the command values to parse each row of the superframe 600 into its constituent parts. For example, the SM 804 may treat a row as header data or pixel data, ignore some parts of a row (e.g., the parts defined by the B2B field 714, etc.), or skip an entire row (e.g., the rows specified by the B2BIDLE field 708, etc.), etc. based on the command values. At the start of superframe processing, the SM 804 ignores video interface data from the video interface data port until the first active row of an input frame. The data from this first active row is stored in header status registers of the SCR 802 by the SM 804 and is accessible by control and state register (CSR) reads. If the value in the first bytes (e.g., a first 4 bytes that correspond to the signature prefix code 702) does not match an expected signature stored in the SCR 802, the SM 804 does not process this superframe and waits for the start of the next superframe. In such a manner, the SM 804 can efficiently dispose of invalid superframes. In some examples, the DMA controller 553 obtains the expected signature via a setup frame sent before the first superframe. In some such examples, the setup frame is communicated using the data communication interface 556B. Additionally, if the FRAME number (e.g., the value in the frame ID 704) in the received superframe header 700 is the same as the FRAME number of the last processed superframe, then the SM 804 ignores the current superframe. Such a scenario, for example, indicates the application SoC 510B did not update this superframe in time before being read by its video communication interface DMA controller. After parsing the data stream, the SM 804 reconstructs the surface textures from the subframe payloads 602.

The SM 804 may cause, based on the content of the SCR 802, the color conversion block 806 to convert a reconstructed surface texture from one pixel format to another pixel format. In such examples, the color conversion block 806 converts the pixel data from the input pixel format (e.g., as specified by the value in the IN_FORMAT field 808 that was stored in the SCR 802) to the output pixel format (e.g., as specified by the value in the OUT_FORMAT field 810 that was stored in the SCR 802). For example, before being stored, the pixel data may be color space converted from an RGBX8888 pixel to a YUV 4:4:4 pixel. The conversion matrix for the color space conversion (CSC) from RGB to YUV is programmable with, for example, 9 16-bit coefficients (all with 3.13 precision to support 1 sign bit and 2 bits of magnitude for headroom) and 3 offset values (with 11.5 precision). The conversion matrix may be implemented as a 3-stage pipeline of 3 parallel Multiply-Accumulator (MAC) functions. The first stage uses the OFFSET values as the addition operand, while the other two stages use the result from the prior stage as the addition operand.

In some examples, after the CSC pipeline, the SM 804 causes the chroma subsampling block 808 to perform chroma subsampling from, for example, YUV 4:4:4 to YUV 4:2:0 (sometimes referred to as "UV decimation").

The SM 804 causes memory write block 810 to writes the reconstructed surface textures to the appropriate location in memory based on surface handle ID in the ID field 802 of the corresponding subframe header. The handle IDs of the surfaces may be established by the setup frame. The memory write block 810 packs data for write bursts, driving a communication interface bus with data being written to memory addresses of the memory 514 that were setup on a write address channel bus. memory write block 810 also generates write burst requests with addresses and burst length.

Figure 10:
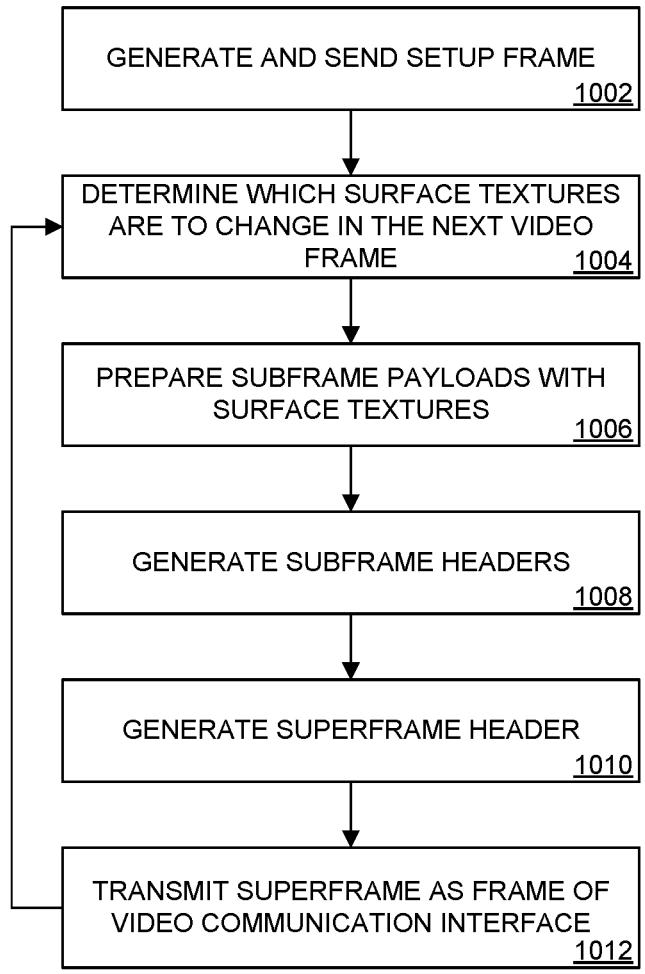
FIG. 10 is a flowchart of an example method of generating and transmitting the superframe of FIG. 6.

FIG. 10 is a flowchart of an example method of generating and transmitting the superframe 600 of FIG. 6. Initially, the application SoC 510B generates and transmits a setup frame to the AR co-processing SoC 510A (block 1002). In some examples, the setup frame is sent via the data communication interface 556B. The setup frame includes information to process and display the surface textures, including, for example, number of surface textures, handle IDs for surface textures, locations in memory to store the surface textures, and/or frame signatures, etc. The application SoC 510B determines which surface textures are to change in the next video frame (block 1004). In some examples, only a portion of the surface textures update in each video frame. For example, one or more surface textures may be static and infrequently change from video frame to video frame (sometimes referred to as "static images"), while one or more surface textures may be animated and frequently change from video frame to video frame (sometimes referred to as "dynamic images" or "animated images"). In some examples, the surface textures are categorized as either static images or dynamic images, where the dynamic images change in the next video frame.

The application SoC 510B prepares subframe payloads with the surface textures that are to change in the next video frame (block 1006). The application SoC 510B may, for example, pad the surface textures to conform with the superframe width. The application SoC 510B generates the subframe headers that correspond with the generated subframe payloads (e.g., determines the values for the fields 710 to 726 of FIG. 7) (block 1008). The subframe headers include the parameters associated with the surface texture in the subframe payload. The application SoC 510B then generates the superframe header, which includes the generated subframe headers (e.g., determines the values for the fields 702 to 708 of FIG. 7) (block 1010). The application SoC 510B then transmits the superframe via a video frame over the video communication interface 555B (block 1012). In some examples, because the video communication interface 555B may transmit the contents of memory in which the application SoC 510B stores the superframe to be transmitted periodically (e.g., 60 times per second, etc.), the application SoC 510B does not update the frame number (e.g., in the FRAME field 704 of the superframe header 700) until the contents of the superframe are complete. Thus, the superframe is discarded by the AR co-processing SoC 510A if it is not complete.

Figure 11:
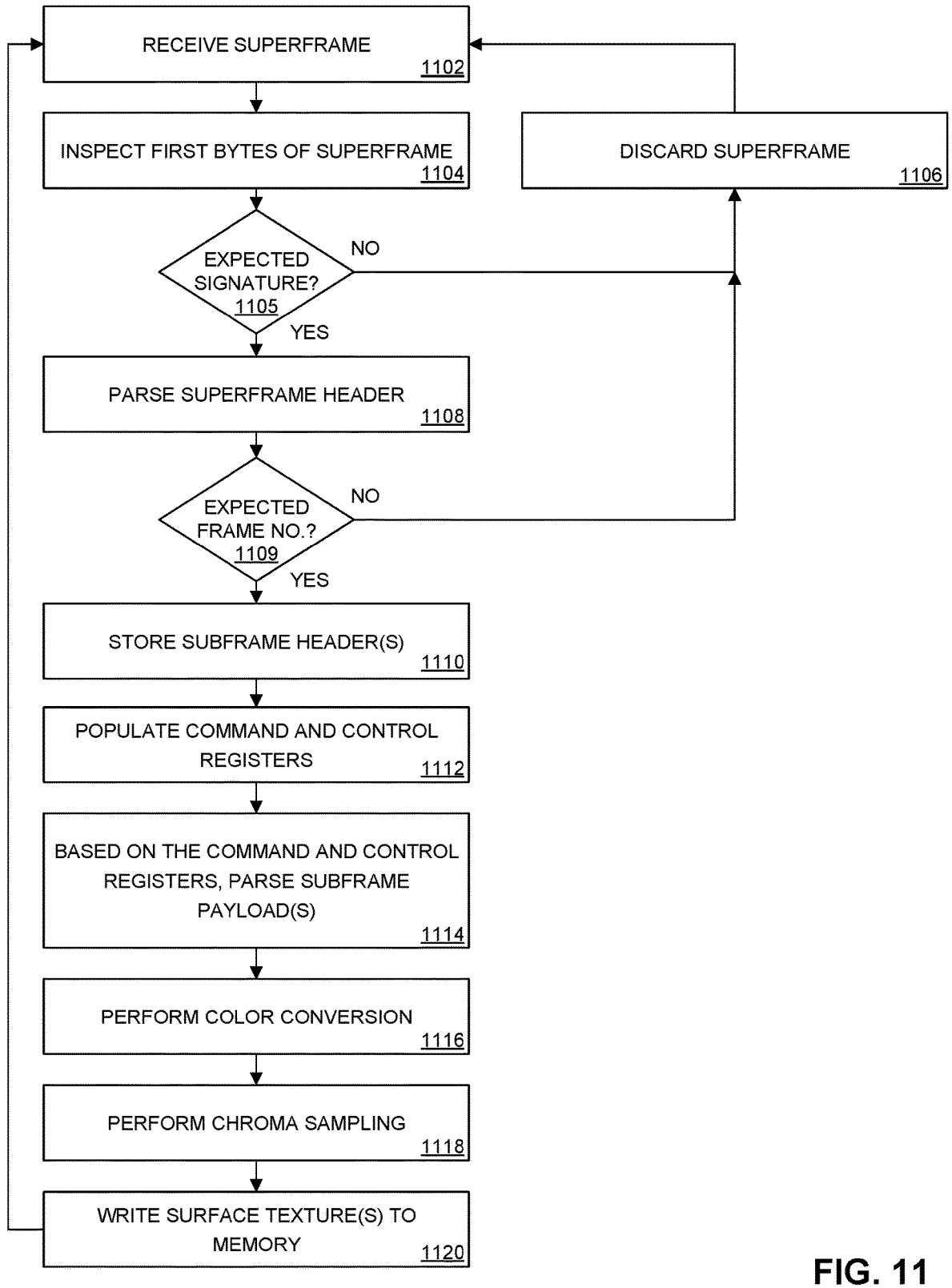
FIG. 11 is a flowchart of an example method of processing the superframe to retrieve the surface textures.

FIG. 11 a flowchart of an example method of processing the superframe to retrieve the surface textures. The DMA controller 553 receives, via the video communication interface 555A, a superframe containing surface texture data (block 1102). The DMA controller 553 inspects the first bytes (e.g., the first four bytes, etc.) of the superframe (block 1104). When the when the first bytes of the superframe do not match an expected signature (e.g., a signature provided by a setup frame) (NO at block 1105), the DMA controller 553 discards the superframe (block 1106). When the first bytes of the superframe match the expected signature (YES at block 1105), the DMA controller 553 continues to parse the superframe header (block 1108). The superframe header includes a frame counter (e.g., in the FRAME field 704 of the superframe header 700). When the frame counter has not changed from the previously received frame counter (NO at block 1109), the DMA controller 553 discards the superframe (block 1106). When the frame counter has changed from the previously received frame counter (YES at block 1109), the DMA controller 553 stores the subframe headers in the SCR 802 (block 1110). The DMA controller 553 populates the SCR 802 based on the subframe headers and the superframe header (block 1112). For example, the DMA controller 553 determines the starting locations within the superframe of the subframe payloads. Based on the commands in the SCR 802, the DMA controller 553 parses the superframe to receive surface textures from the subframe payloads (block 1114). In some examples, when the input pixel format (e.g., as specified by the input field 716 of the subframe header 601) and the output pixel format (e.g., as specified by the output field 718 of the subframe header 601) do not match, the DMA controller 553 performs color conversion on the surface textures (block 1116) by converting the surface texture data from one pixel format to another pixel format. In some examples, the DMA controller 553 performs chroma subsampling on the surface textures (block 1118). The DMA controller 553 then writes the surface textures to memory (block 1120). Subsequently, the DMA controller 553 provides the surface textures from memory to a communication device (e.g., radio transmitter) using interface 584 to transmit, directly or indirectly (e.g., via the AR central processing SOC 530A), the surface texture data from the memory to a display device to be rendered for display.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. An artificial reality system, comprising:
   a first integrated circuit; and
   a second integrated circuit communicatively coupled to the first integrated circuit by a data communication interface and a video communication interface;
   wherein the first integrated circuit comprises at least one processor configured to:
      identify surfaces of a frame to be displayed in a next display cycle, wherein each of the surfaces has a specified width and height within the frame and comprises surface texture data;
      categorize a portion of the surfaces of the frame as dynamic surfaces to be updated in the frame, wherein each of the dynamic surfaces comprises one of the surfaces for which the surface texture data changes in the frame;
      generate a setup frame for transmission to the second integrated circuit using the data communication interface, wherein the setup frame defines the dynamic surfaces to be updated in the frame; and
      generate a superframe as a video frame of a video data transfer protocol defined to carry pixel data for transmission to the second integrated circuit using the video communication interface, wherein the superframe includes multiple subframe payloads that carry the surface texture data of the dynamic surfaces to be updated in the frame and a superframe header that includes subframe headers corresponding to the subframe payloads, and wherein each of the subframe headers includes parameters of a corresponding one of the subframe payloads;
   wherein the second integrated circuit comprises a direct access memory (DMA) controller configured to:
      upon receipt of the superframe, write the surface texture data within each of the subframe payloads directly to an allocated location in memory based on the parameters included in the corresponding one of the subframe headers; and
      transmit the surface texture data from the memory to a display device to be rendered for display.

2. The artificial reality system of claim 1, wherein the superframe header including the subframe headers is positioned at a beginning of the superframe.

3. The artificial reality system of claim 1, wherein the superframe header includes multiple validity fields used by the second integrated circuit to determine whether the superframe is valid.

4. The artificial reality system of claim 1, wherein the superframe header specifies a location within the superframe of a first subframe payload of the multiple subframe payloads.

5. The artificial reality system of claim 1, wherein each of the subframe headers specifies an input pixel format of the surface texture data within the corresponding one of the subframe payloads and an output pixel format for the surface texture data within the corresponding one of the subframe payloads.

6. The artificial reality system of claim 5, wherein the second integrated circuit is configured to, when the input pixel format and the output pixel format do not match, convert the surface texture data within the corresponding one of the subframe payloads from the first pixel format to the second pixel format before storing the surface texture data into the memory.

7. The artificial reality system of claim 1, wherein each of the subframe headers within the superframe header specifies a location within the superframe of the corresponding one of the subframe payloads.

8. The artificial reality system of claim 1, wherein the first integrated circuit is configured to transmit the superframe to the second integrated circuit as the video frame of the video data transfer protocol using a mode of the video communication interface that does not alter the surface texture data within the subframe payloads of the superframe during transmission.

9. The artificial reality system of claim 1, wherein the DMA controller of the second integrated circuit is configured to, upon receipt of the superframe, write the subframe headers within the superframe header of the superframe into status and control registers.

10. A method comprising:
identifying, by a first integrated circuit of an artificial reality (AR) system, surfaces of a frame to be displayed in a next display cycle, wherein each of the surfaces has a specified width and height within the frame and comprises surface texture data;
categorizing, by the first integrated circuit, a portion of the surfaces of the frame as dynamic surfaces to be updated in the frame, wherein each of the dynamic surfaces comprises one of the surfaces for which the surface texture data changes in the frame;
generating, by the first integrated circuit, a setup frame for transmission to a second integrated circuit of the AR system using a data communication interface, wherein the setup frame defines the dynamic surfaces to be updated in the frame;
generating, by the first integrated circuit, a superframe as a video frame of a video data transfer protocol defined to carry pixel data for transmission to the second integrated circuit using a video communication interface, wherein the superframe includes multiple subframe payloads that carry the surface texture data of the dynamic surfaces to be updated in the frame and a superframe header that includes subframe headers corresponding to the subframe payloads, and wherein each of the subframe headers includes parameters of the corresponding one of the subframe payloads;
upon receipt of the superframe, writing, by a direct access memory (DMA) controller of the second integrated circuit, the surface texture data within each of the subframe payloads directly to an allocated location in memory based on the parameters included in the corresponding one of the subframe headers; and
transmitting, by the second integrated circuit, the surface texture data from the memory to a display device to be rendered for display.

11. The method of claim 10, wherein generating the superframe comprises generating the superframe header positioned at a beginning of the superframe, the superframe header including the subframe headers.

12. The method of claim 10, wherein the superframe header includes multiple validity fields used by the second integrated circuit to determine whether the superframe is valid.

13. The method of claim 10, wherein the superframe header specifies a location within the superframe of a first subframe payload of the multiple subframe payloads.

14. The method of claim 10, wherein each of the subframe headers specifies an input pixel format of the surface texture data within the corresponding one of the subframe payloads and an output pixel format for the surface texture data within the corresponding one of the subframe payloads.

15. The method of claim 14, further comprising, when the input pixel format and the output pixel format do not match, converting, by the second integrated circuit, the surface texture data within the corresponding one of the subframe payloads from the first pixel format to the second pixel format before storing the surface texture data into the memory.

16. The method of claim 10, wherein each of the subframe headers within the superframe header specifies a location within the superframe of the corresponding one of the subframe payloads.

17. The method of claim 10, further comprising, upon receipt of the superframe, writing, by the DMA controller of the second integrated circuit, the subframe headers within the superframe header of the superframe into status and control registers.

18. A non-transitory computer-readable storage medium comprising instructions that, when executed, configure processing circuitry of an artificial reality (AR) system to:
identify, by a first integrated circuit of the AR system, surfaces of a frame to be displayed in a next display cycle, wherein each of the surfaces has a specified width and height within the frame and comprises surface texture data;
categorize, by the first integrated circuit, a portion of the surfaces of the frame as dynamic surfaces to be updated in the frame, wherein each of the dynamic surfaces comprises one of the surfaces for which the surface texture data changes in the frame;
generate, by the first integrated circuit, a setup frame for transmission to a second integrated circuit of the AR system using a data communication interface, wherein the setup frame defines the dynamic surfaces to be updated in the frame;
generate, by the first integrated circuit, a superframe as a video frame of a video data transfer protocol defined to carry pixel data for transmission to the second integrated circuit using a video communication interface, wherein the superframe includes multiple subframe payloads that carry the surface texture data of the dynamic surfaces to be updated in the frame and a superframe header that includes subframe headers corresponding to the subframe payloads, and wherein each of the subframe headers includes parameters of the corresponding one of the subframe payloads;

upon receipt of the superframe, write, by a direct access memory (DMA) controller of the second integrated circuit, the surface texture data within each of the subframe payloads directly to an allocated location in memory based on the parameters included in the corresponding one of the subframe headers; and transmit, by the second integrated circuit, the surface texture data from the memory to a display device to be rendered for display.

* * * * *